(12) United States Patent
Toba et al.

(10) Patent No.: US 9,168,508 B2
(45) Date of Patent: Oct. 27, 2015

(54) METHOD FOR PRODUCING BIODIESEL FUEL AND BIODIESEL FUEL COMPOSITION

(75) Inventors: Makoto Toba, Tsukuba (JP); Yuji Yoshimura, Tsukuba (JP); Yoko Abe, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 341 days.

(21) Appl. No.: 13/580,430

(22) PCT Filed: Feb. 18, 2011

(86) PCT No.: PCT/JP2011/053473
§ 371 (c)(1),
(2), (4) Date: Nov. 8, 2012

(87) PCT Pub. No.: WO2011/105291
PCT Pub. Date: Sep. 1, 2011

(65) Prior Publication Data
US 2013/0055625 A1    Mar. 7, 2013

(30) Foreign Application Priority Data
Feb. 24, 2010    (JP) .................. 2010-058335

(51) Int. Cl.
| | |
|---|---|
| *B01J 23/44* | (2006.01) |
| *B01J 23/40* | (2006.01) |
| *B01J 29/068* | (2006.01) |
| *B01J 29/12* | (2006.01) |
| *B01J 35/00* | (2006.01) |
| *B01J 37/00* | (2006.01) |
| *C10L 1/02* | (2006.01) |
| *C11C 3/00* | (2006.01) |
| *C11C 3/12* | (2006.01) |
| *B01J 37/18* | (2006.01) |
| *C10L 1/08* | (2006.01) |
| *C10G 3/00* | (2006.01) |

(52) U.S. Cl.
CPC *B01J 23/44* (2013.01); *B01J 23/40* (2013.01); *B01J 29/068* (2013.01); *B01J 29/126* (2013.01); *B01J 35/002* (2013.01); *B01J 37/0009* (2013.01); *B01J 37/18* (2013.01); *C10G 3/47* (2013.01); *C10G 3/50* (2013.01); *C10L 1/026* (2013.01); *C10L 1/08* (2013.01); *C11C 3/003* (2013.01); *C11C 3/126* (2013.01); *B01J 2229/18* (2013.01); *B01J 2229/42* (2013.01); *Y02E 50/13* (2013.01)

(58) Field of Classification Search
CPC ......... B01J 23/44; B01J 23/40; B01J 29/068; B01J 29/126; B01J 35/002; B01J 37/0009; B01J 37/18; C10L 1/026; C10L 1/08; C10G 3/47; C10G 3/50; C11C 3/003; C11C 3/126
USPC ........................................... 585/240
See application file for complete search history.

(56) References Cited

U.S. PATENT DOCUMENTS

2006/0161032 A1 * 7/2006 Murzin et al. ............... 585/240
2007/0259771 A1   11/2007 Nakano et al.

FOREIGN PATENT DOCUMENTS

WO    2009095711 A1    8/2009

* cited by examiner

*Primary Examiner* — Cephia D Toomer
(74) *Attorney, Agent, or Firm* — Sughrue Mion, PLLC

(57) ABSTRACT

Provided is a method for producing biodiesel fuel having an excellent oxidative stability and fluidity at low temperature, wherein the method provides selective hydrogenation of a poly-unsaturated fatty acid alkyl ester to the mono-unsaturated fatty acid alkyl ester while inhibiting the formation of the trans-isomer, and a biodiesel fuel composition. In the method for producing biodiesel fuel, a fatty acid alkyl ester prepared from fat and/or waste edible oil by transesterification reaction, and/or (2) a fatty acid alkyl ester treated by esterification reaction of a fatty acid is hydrogenated in the presence of a hydrogenation catalyst containing at least one of noble metals selected from those of Groups 8-10 in the periodic table under low hydrogen pressure.

18 Claims, No Drawings ured Feb. 18, 2011, claiming
METHOD FOR PRODUCING BIODIESEL FUEL AND BIODIESEL FUEL COMPOSITION

CROSS REFERENCE TO RELATED APPLICATIONS

This application is a National Stage of International Application No. PCT/JP2011/053473filed Feb. 18, 2011, claiming priority based on Japanese Patent Application No. 2010-058335, filed Feb. 24, 2010, the contents of all of which are incorporated herein by reference in their entirety.

TECHNICAL FIELD

The present invention relates to a method for producing biodiesel fuel having an excellent oxidative stability, the biodiesel fuel is made from (1) a fatty acid alkyl ester prepared from fat and/or waste edible oil by transesterification reaction, and/or (2) a fatty acid alkyl ester treated by esterification reaction of a fatty acid as a starting material, and to a method for producing a mixture of the fuel and petroleum-diesel. More particularly, the present invention relates to a method for producing biodiesel fuel having an excellent oxidative stability and low temperature fluidity, the method comprising hydrogenating the starting material in the presence of a certain hydrogenation catalyst under hydrogen pressure as low as several atmospheric pressure, and to a method for producing a mixture of the biodiesel fuel and petroleum diesel. The present invention also relates to a biodiesel fuel composition.

BACKGROUND ART

Recently, the use of alternative fuel other than conventional petroleum-based fuel, in particular, biomass fuel is attracting attention in order to address diversification of energy sources and prevention of global warming. Of the biomass fuel, those made from animal or vegetable fat or waste edible oil, such as rapeseed oil, soybean oil, palm oil, coconut oil, sunflower oil, Jatropha oil, beef tallow, lard, and fish oil, have such characteristics as containing less sulphur and being a carbon neutral fuel, so that these fuels are attracting attention as alternative fuel for petroleum-based diesel.

Triglycerides, which are main ingredient of fat such as rapeseed oil, soybean oil, palm oil, coconut oil, sunflower oil, Jatropha oil, have a high viscosity. When the untreated triglycerides are used to a diesel engine, they tend to form a deposit in an engine or an injection valve. In contrast, fatty acid alkyl esters, which are obtained by transesterificating the triglyceride with a lower alcohol such as methanol or ethanol in the presence of homogeneous catalyst such as potassium hydrate, are called as biodiesel oil. Biodiesel oil has a low viscosity, and is used as alternative fuel for petroleum in diesel engine. In addition, there is an application to add and mix a certain amount of biodiesel oil with petroleum-based diesel engine fuel.

Standards for the properties of 100% biodiesel fuel used as the alternative fuel for petroleum are JIS K2391 (Japan), EN14214 (Europe), and ASTM D6751-09 (USA). In contrast, for mixed oil of biodiesel fuel and petroleum diesel (hereinafter, sometimes referred as biodiesel mixed or blended fuel), Act on the Quality Control of Gasoline and Other Fuels was revised (hereinafter, referred as revised Act on the Quality Control) and fully implemented in 25 Feb. 2009 in order to ensure the quality.

The standard is strict in that the increment of acids by oxidation of biodiesel mixed fuel (the mixed ratio of biodiesel is at most 5 percent by weight) is below 0.12 mgKOH/g under more strict oxidation condition than that as defined in ISO Standard (ISO12205) for oxidative stability of middle distillate, i.e. under a forced oxidation condition of blowing pure oxygen gas at 115° C. for 16 hours, the increment of acids is evaluated the amount of potassium hydrate required to neutralize the acid with basic potassium hydrate.

In order to improve oxidative stability of biodiesel fuel, technologies of adding some antioxidant to the fuel are known. Several technologies, such as adding propyl gallate as an antioxidant (Patent literature 1), adding a quinoline antioxidant or a phenylenediamine antioxidant (Patent literature 2), and adding a hindered amine antioxidant and a hindered phenol antioxidant (Patent literature 3) are reported.

Biodiesel fuel is easily oxidizable because it contains an easily autooxidizable unsaturated fatty acid. In particular, a polyunsaturated fatty acid having two or more carbon-carbon double bonds is extremely oxidizable, which causes formation of acids or sludge. Therefore, in the case of biodiesel fuel containing a large amount of unsaturated fatty acid, adding antioxidants to biodiesel fuel is not sufficient to improve oxidative stability so as to meet the standard within an economical range of additive amount.

Additionally, even if antioxidants are added to biodiesel fuel, the problem forming sludge due to polymerization of unsaturated bonds still can't be solved. There is a need of further technologies to improve oxidative stability of biodiesel fuel.

One method of decreasing the polyunsaturated fatty acid in biodiesel fuel with a poor oxidative stability is a method to hydrogenate its unsaturated bond with a hydrogenation catalyst. Generally, hydrogenation of fuel oil is often carried out under high hydrogen pressure. For example, hydrogenation catalysts for hydrocarbon oil and the method for producing and activating thereof are proposed in Patent literatures 4 and 5. However, extremely high pressure, for example 3.9 MPa, is required to hydrogenate in these technologies. In addition, Patent literature 6 describes a method for partial hydrogenating fatty acid alkyl ester oils. However, in the method, hydrogenation is carried out under extremely high pressure of 10 MPa, and used a combination of surfactant and homogeneous catalyst, which causes a problem of separating them from the product.

However, hydrogenation under high pressure is expensive to introduce and maintain the facility. Therefore, there is a need to develop a hydrogenation method without the need of pressure resistant facilities. Because local governments or small manufacturers often produce biodiesel oil, and they don't possess such a high pressure facilities, the hydrogenation under low pressure is particularly required. Additionally, it is also advantageous that realization of hydrogenation under low pressure allows resolving the difficulty in dealing with High Pressure Gas Safety Act.

Also, in terms of variation of the fatty acid component in biodiesel fuel due to hydrogenation, when the reaction of the fuel is carried out under high hydrogen pressure, the reaction can't stop at the mono-unsaturated fatty acid alkyl ester, and the ester is further hydrogenated to its saturated fatty acid alkyl ester. Saturated fatty acid alkyl esters have higher melting point than unsaturated fatty acid alkyl esters, so they have a poor fluidity at low temperature, they can't be used as fuel.

In order to address these problems, the inventors propose a hydrogenation catalyst capable of obtaining biodiesel fuel having an excellent oxidative stability by hydrogenating selectively a polyunsaturated fatty acid alkyl ester having two or more double bonds with a poor oxidative stability in the fatty acid alkyl ester contained in biodiesel fuel to obtain the mono-unsaturated fatty acid alkyl ester with relatively good fluidity at low temperature and oxidative stability (Patent literature 7).

CITATION LIST

Patent Literature

[Patent literature 1] International Publication number WO 2006/129435
[Patent literature 2] Japanese Unexamined Patent Application Publication No. 2009-57510
[Patent literature 3] Japanese Unexamined Patent Application Publication (Translation of PCT Application) No. 2009-522421
[Patent literature 4] Japanese Unexamined Patent Application Publication No. Hei 8-332385
[Patent literature 5] Japanese Unexamined Patent Application Publication No. 2006-297313
[Patent literature 6] International Publication number WO 2008/43454
[Patent literature 7] International Publication number WO 2008/105518

SUMMARY OF THE INVENTION

Technical Problem

The catalyst supposed by the inventors is superior in terms of selective hydrogenation an unsaturated fatty acid alkyl ester to the mono-unsaturated fatty acid alkyl ester. However, the inventors found that the content of trans-isomer of the mono-unsaturated fatty acid alkyl ester is high, the trans-isomer is formed by hydrogenation of poly-unsaturated fatty acid alkyl ester or isomerization of the cis-isomer. Additionally, the inventors found that biodiesel fuel containing the hydrogenated unsaturated fatty acid alkyl ester had problems of a poor fluidity at low temperature and a precipitation of components during storage. Just like saturated fatty acid alkyl esters, trans-isomers have better good linearity of molecules than cis-isomers, so that they can easily be crystallized, and have a high melting point. For example, the melting point of oleic acid, cis-isomer, in untreated biodiesel fuel is 13.4° C., whereas that of elaidic acid, trans-isomer having a double bond at the same position, is 46.5° C., which is extremely higher. However, the inventors realized that inhibiting the formation of the trans-isomer having high melting point is essential to produce biodiesel fuel having an excellent fluidity at low temperature, no precipitation of crystals, and high oxidative stability.

Therefore, an object of the present invention is to provide a method for producing biodiesel fuel capable of selective hydrogenating a poly-unsaturated fatty acid alkyl ester to the mono-unsaturated fatty acid alkyl ester while inhibiting the formation of the trans-isomer in order to produce biodiesel fuel having an excellent oxidative stability and fluidity at low temperature.

Solution to Problem

The inventors made an effort to improve a hydrogenation catalyst for biodiesel fuel, and found that the catalyst described above is useful for hydrogenating a mixture of a fatty acid alkyl ester and petroleum-diesel under low pressure in terms of resistance to sulphur in the petroleum-diesel, however, when treated the fatty acid alkyl ester only, rare earth elements contained in the hydrogenation catalyst composition are not essential.

In addition, the inventors found that the catalyst capable of meeting these requests can be obtained by using a porous inorganic oxide support having a small number of acidic sites as a support for the hydrogenation catalyst so that the carbon-carbon double bond is not adsorbed and concentrated to an acidic hydroxyl group on the porous inorganic oxide support, and the bond is not easily isomerized to trans-isomer as hydrogenation reaction proceeds, and supporting noble metal, which is an active ingredient, on surface of the support only, which completed this invention.

Therefore, the first preferred embodiment is a method for producing biodiesel fuel, comprising: hydrogenating (1) a fatty acid alkyl ester prepared from fat and/or waste edible oil by transesterification reaction, and/or (2) a fatty acid alkyl ester treated by esterification reaction of a fatty acid in the presence of a hydrogenation catalyst containing at least one of noble metals selected from those of Groups 8-10 in the periodic table under low hydrogen pressure. It is noted that the low pressure means a lower pressure than as applied in conventional hydrogenation techniques of hydrocarbon oil.

The second preferred embodiment is a method for producing petroleum diesel-containing biodiesel fuel, comprising: (a) hydrogenating (1) the fatty acid alkyl ester of the first preferred embodiment in the presence of a hydrogenation catalyst containing at least one of noble metals selected from those of Groups 8-10 in the periodic table under low hydrogen pressure; and (b) mixing the resulting hydrogenated product and petroleum diesel.

The third preferred embodiment is a method for producing biodiesel fuel, comprising at least the steps of: (c) (1) trans-esterificating fat and/or waste edible oil, and/or (2) esterificating a fatty acid; and (d) hydrogenating the resulting reaction product in the presence of a hydrogenation catalyst containing at least one of noble metals selected from those of Groups 8-10 in the periodic table under low hydrogen pressure.

The forth preferred embodiment is a method for producing petroleum diesel -containing biodiesel fuel, comprising at least the steps of: (c) (1) transesterificating fat and/or waste edible oil, and/or (2) esterificating a fatty acid; (d) hydrogenating the resulting reaction product in the presence of a hydrogenation catalyst containing at least one of noble metals selected from those of Groups 8-10 in the periodic table under low hydrogen pressure; and (e) mixing the resulting hydrogenated product and petroleum diesel.

The fifth preferred embodiment is a method for producing biodiesel fuel according to the first preferred embodiment or the third preferred embodiment, wherein the hydrogen pressure is less than 1 MPa.

The sixth preferred embodiment is a method for producing biodiesel fuel according to the first preferred embodiment or the third preferred embodiment, wherein the hydrogenation catalyst is free of any rare earth element.

The seventh preferred embodiment is a method for producing biodiesel fuel according to the first preferred embodiment or the third preferred embodiment, wherein a support for the hydrogenation catalyst is a porous inorganic oxide support having a small number of acidic sites. The support having a small number of acidic sites is also a support having an adsorption heat of 90 kJ/mol and less, measured by ammonia adsorption heat test.

The eighth preferred embodiment is a method for producing biodiesel fuel according to the second preferred embodiment or the fourth preferred embodiment, wherein the hydrogen pressure is less than 1 MPa.

The ninth preferred embodiment is a method for producing biodiesel fuel according to the second preferred embodiment or the fourth preferred embodiment, wherein the hydrogenation catalyst is free of any rare earth element.

The tenth preferred embodiment is a method for producing biodiesel fuel according to the second preferred embodiment or the fourth preferred embodiment, wherein a support for the hydrogenation catalyst is a porous inorganic oxide support having a small number of acidic sites. The support having a small number of acidic sites is also a support having an adsorption heat of 90 kJ/mol and less, measured by ammonia adsorption heat test.

The eleventh preferred embodiment is a method for producing petroleum diesel-containing biodiesel fuel according to the first preferred embodiment or the third preferred embodiment, wherein (1) a fatty acid alkyl ester prepared from fat and/or waste edible oil by transesterification reaction, and/or (2) a fatty acid alkyl ester treated by esterification reaction of a fatty acid is biodiesel.

The twelfth preferred embodiment is a method for producing petroleum diesel-containing biodiesel fuel according to the second preferred embodiment or the fourth preferred embodiment, wherein (1) a fatty acid alkyl ester prepared from fat and/or waste edible oil by transesterification reaction, and/or (2) a fatty acid alkyl ester treated by esterification reaction of a fatty acid is biodiesel.

The thirteenth preferred embodiment is a petroleum diesel-containing mixture obtained by mixing the biodiesel fuel produced by the method for producing biodiesel fuel according to the first preferred embodiment or the third preferred embodiment and petroleum diesel.

The fourteenth preferred embodiment is a biodiesel fuel composition comprising a hydrogenated product of a fatty acid alkyl ester, wherein (a) the fatty acid composition of the fatty acid alkyl ester is
 (1) 2.5 percent by weight and less of fatty acid having a carbon number of 14 and less,
 (2) 30 percent by weight and less of fatty acid having a carbon number of 16,
 (3) 70 percent by weight and more of fatty acid having a carbon number of 18, and
 (4) 3 percent by weight and less of fatty acid having a carbon number of 20 and more;
and wherein said hydrogenated product has the amount of the di- or more-unsaturated fatty acid alkyl ester of 10 percent by weight and less, and the ratio of a trans-fatty acid alkyl ester in the mono-unsaturated fatty acid alkyl ester having a carbon number of 18, of 17 percent by weight and less.

The fifteenth preferred embodiment is a biodiesel fuel composition comprising a hydrogenated product of a fatty acid alkyl ester, wherein (a) the fatty acid composition of the fatty acid alkyl ester is
 (1) 2.5 percent by weight and less of fatty acid having a carbon number of 14 and less,
 (2) from 30 to 60 percent by weight of fatty acid having a carbon number of 16,
 (3) from 40 to 70 percent by weight of fatty acid having a carbon number of 18, and
 (4) 3 percent by weight and less of fatty acid having a carbon number of 20 and more;
and wherein said hydrogenated product has the amount of the di- or more-unsaturated fatty acid alkyl ester of 8 percent by weight and less, and the ratio of a trans-fatty acid alkyl ester in the mono-unsaturated fatty acid alkyl ester of 5 percent by weight and less.

The sixteenth preferred embodiment is a biodiesel fuel composition comprising a hydrogenated product of a fatty acid alkyl ester, wherein (a) the fatty acid composition of the fatty acid alkyl ester is
 (1) 10 percent by weight and less of fatty acid having a carbon number of 14 and less,
 (2) from 10 to 30 percent by weight of fatty acid having a carbon number of 16,
 (3) from 10 to 35 percent by weight and less of fatty acid having a carbon number of 18,
 (4) 30 percent by weight and more of fatty acid having a carbon number of 20 and more, and
 (5) the amount of the tetra- or more-unsaturated fatty acid is 10 percent by weight and more;
and wherein said hydrogenated product has the amount of the di- or more-unsaturated fatty acid alkyl ester of 15 percent by weight and less, and the ratio of a trans-fatty acid alkyl ester in the mono-unsaturated fatty acid alkyl ester having a carbon number of 18, of 28 percent by weight and less.

The seventeenth preferred embodiment is biodiesel fuel according to any one of the fourteenth preferred embodiment, the fifteenth preferred embodiment, and the sixteenth preferred embodiment, wherein the time that elapses before the inflection point which the conductivity of the fuel changes rapidly (i.e. induction time) is 10 hours and more, when the fuel is oxidized according to the method described in European biodiesel fuel standard EN14112.

The eighteenth preferred embodiment is petroleum diesel-containing biodiesel fuel obtained by mixing the biodiesel fuel according to any one of the fourteenth preferred embodiment, the fifteenth preferred embodiment, and the sixteenth preferred embodiment and petroleum diesel, wherein the increment of acid value of the resulting biodiesel mixed oil is 0.12 mgKOH/g and less after a forced oxidation while blowing pure oxygen gas at 115° C. for 16 hours.

The nineteenth preferred embodiment is a hydrogenation catalyst composition for producing biodiesel fuel or petroleum diesel-containing biodiesel fuel, comprising at least one of noble metals selected from those of Groups 8-10 in the periodic table.

The twentieth preferred embodiment is a hydrogenation catalyst composition for producing biodiesel fuel or petroleum diesel-containing biodiesel fuel according to the nineteenth preferred embodiment, wherein at least one of noble metals selected from those of Groups 8-10 in the periodic table is on the surface of the catalyst particles.

Hereinafter, the present invention will be described in detail. Fat of the present invention including animal fat or vegetable fat, or waste edible oil may be used. Far as a raw material for biodiesel is largely classified as follows based on, for example, the fatty acid composition of triglyceride.

A group: fat comprising 2.5 percent by weight and less of fatty acid having a carbon number of 14 and less, 30 percent by weight and less of fatty acid having a carbon number of 16, 70 percent by weight and more of fatty acid having a carbon number of 18, and 3 percent by weight and less of fatty acid having a carbon number of 20 and more. The A group includes rapeseed oil, soybean oil, Jatropha oil, safflower oil, sunflower oil, olive oil, cottonseed oil, and wood oil.

B group: fat comprising 2.5 percent by weight and less of fatty acid having a carbon number of 14 and less, from 30 to 60 percent by weight of fatty acid having a carbon number of 16, from 40 to 70 percent by weight of fatty acid having a carbon number of 18, and 3 percent by weight and less of fatty acid having a carbon number of 20 and more. The B group includes crude palm oil, purified palm oil which natural antioxidant was removed.

C group: fat comprising 10 percent by weight and less of fatty acid having a carbon number of 14 and less, from 10 to 30 percent by weight of fatty acid having a carbon number of 16, from 10 to 35 percent by weight and less of fatty acid having a carbon number of 18, 10 percent by weight and more of fatty acid having a carbon number of 20 and more, and the amount of the tetra- or more-unsaturated fatty acid is 10 percent by weight and more. The C group includes fish oil.

D group: fat comprising 20 percent by weight and more of fatty acid having a carbon number of 14 and less, 30 percent by weight and less of fatty acid having a carbon number of 16, 40 percent by weight and less of fatty acid having a carbon number of 18, and 3 percent by weight and less of fatty acid having a carbon number of 20 and more. The D group includes coconut oil and palm kernel oil, in which the amount of saturated fatty acid is 90 percent by weight and more. The composition of waste edible oil is depend strongly on the raw material, however, the main ingredient belongs to group A and B.

Transesterificating the fat to form the fatty acid alkyl ester is necessary. The fatty acid alkyl ester of the invention is not particularly limited, provided that biodiesel fuel can be produced by the fatty acid alkyl ester. Raw materials and method for the fatty acid alkyl ester are not particularly limited.

Transesterification reaction has been widely investigated, so the conclusion can be used in the invention. For example, fat is contacted with an alcohol and mixed each other. In this case, molar ratio of fat to alcohol is preferably from 1:3 to 1:12. The alcohol is preferably a lower alcohol, among them, methanol or ethanol is more preferred, and methanol is highly preferred in terms of properties of transesterification reaction.

In order to promote transesterification reaction, a catalyst is preferably presented in the reaction, including an alkali catalyst, an acid catalyst, and a solid catalyst. The amount of the catalyst used varies based on a catalyst used, reaction condition, fat or alcohol used. For example, in the case of homogeneous catalyst, from 0.3 to 2.0 percent of the catalyst based on the weight of the fat may be used, whereas in the case of heterogeneous catalyst, from 5 to 80 percent of the catalyst based on the volume of reactor may be used. The temperature and time of transesterification reaction varies based on the fat, the alcohol, the catalyst used, for example, may be 40-120° C. for 0.1-6 hours. After the completion of the reaction, by-product glycerin is preferably removed. Transesterification reaction may be carried out by using batch-wise reactor or continuous reactor. Also, enzymes such as lipase may be used as the catalyst.

In the present invention, the fatty acid alkyl ester can also be prepared by esterification of a free fatty acid. The free fatty acid may be a saturated fatty acid or an unsaturated fatty acid, or mixture of both. The fatty acid is preferably derived from fat, the carbon number of the fatty acid is preferably that of the constituent acid of glycerides of the fat. Also, any free fatty acid presented in the fat can be esterified to prepare the fatty acid alkyl ester.

The fatty acid alkyl ester includes saturated fatty acid alkyl esters having no double bond (a capric acid alkyl ester having a carbon number of 10, a lauric acid alkyl ester having a carbon number of 12, a myristic acid alkyl ester having a carbon number of 14, a palmitic acid alkyl ester having a carbon number of 16, a stearic acid alkyl ester having a carbon number of 18, an arachidic acid alkyl ester having a carbon number of 20, a behenic acid alkyl ester having a carbon number of 22, a lignoceric acid alkyl ester having a carbon number of 24), mono-unsaturated fatty acid alkyl esters having one double bond (a palmitoleic acid alkyl ester having a carbon number of 16, an oleic acid alkyl ester having a carbon number of 18, an eicosenoic acid alkyl ester having a carbon number of 20, an erucic acid having a carbon number of 22), di-unsaturated fatty acid alkyl esters having two double bonds (a linoleic acid alkyl ester having a carbon number of 18), tri-unsaturated fatty acid alkyl esters having three double bonds (such as a linolenic acid alkyl ester having a carbon number of 18), tetra-unsaturated fatty acid alkyl esters having four double bonds (such as a stearidonic acid alkyl ester having a carbon number of 18), penta-unsaturated fatty acid alkyl esters having five double bonds (such as an eicosapentaenoic acid alkyl ester having a carbon number of 20, a docosapentaenoic acid alkyl ester having a carbon number of 22), hexa-unsaturated fatty acid alkyl esters having six double bonds (such as a docosahexaenoic acid alkyl ester having a carbon number of 22).

The resulting fatty acid alkyl ester can be purified and hydrogenated, or non-purified crude fatty acid alkyl ester may be hydrogenated. In the present invention, the crude fatty acid alkyl ester is preferably used. For example, the crude fatty acid alkyl ester contains a variety of antioxidants, which results in an advantageous effect.

One of the major characteristics of the present invention is to hydrogenate the fatty acid alkyl ester under low hydrogen pressure. The low pressure as used herein means a lower pressure than as applied in conventional hydrogenation techniques of hydrocarbon oil.

By hydrogenation of the fatty acid alkyl ester, the double bond of the fatty acid alkyl ester is saturated, and geometric isomers (fatty acid alkyl esters which the position of the double bond is changed from cis- to trans-position) or regioisomers (fatty acid alkyl esters which the position of the double bond is changed), and reaction intermediate conjugates (fatty acid alkyl esters which have no methylene group usually found between double bonds, and have a conjugated double bond) are also formed at the same time. In the case of a linoleic acid alkyl ester having a carbon number of 18, octadecenoic acid alkyl esters, stearic acid alkyl esters, conjugated linoleic acid alkyl esters including cis-isomer and trans-isomer are formed by hydrogenation.

As the number of the double bonds increases, oxidative stability of the fatty acid is getting worse. In the case of a fatty acid having a carbon number of 18, linolenic acid having three double bonds is oxidizable about 10 times easier than linoleic acid having two double bonds, linolenic acid having two double bonds is oxidizable about 10 times easier than oleic acid having one double bond. Thus, in hydrogenation, reduction in the amount of the poly-unsaturated fatty acid in the fatty acid alkyl ester is quite important. The amount of the poly-unsaturated fatty acid is preferably, for example, 10 percent by weight and less of the fatty acid alkyl ester. In addition, the amount varies based on the type of the fatty acid alkyl ester to be hydrogenated, but it may be preferably 8 percent by weight and less.

In the present invention, hydrogenation under hydrogen pressure as low as about 1 MPa (absolute pressure) is preferred. Hydrogenation can be carried out at below about 0.7 MPa, or even at below about 0.5 MPa. The amount of 1 MPa is determined because an excellent biodiesel fuel can prepared at the pressure, and it is advantageous economically. Additionally, the nearer to ordinary pressure it is, the more advantageous low pressure is in terms of reaction, components of apparatus, maintenance and running cost of them.

The amount of the trans-fatty acid alkyl ester increases by hydrogenation of unsaturated fatty acid alkyl ester, wherein the trans-fatty acid alkyl ester is not presented in raw materials before hydrogenation. Just like saturated fatty acid alkyl esters, trans-isomers have better good linearity of molecules than cis-isomers, so that they can easily be crystallized, have a high melting point, and have an excellent fluidity at low temperature. In order to obtain biodiesel fuel that has no precipitation of crystals, both formation of saturated fatty acid and optimization of the amount of the trans-fatty acid alkyl ester production are important. That is, the ratio of trans-fatty acid alkyl ester in the mono-unsaturated fatty acid alkyl ester is preferably 17 percent by weight and less after hydrogenation of biodiesel fuel. In addition, the ratio varies based on the type of fatty acid alkyl esters to be hydrogenated, the ratio may be preferably 5 percent by weight and less. When used fish oil as a starting raw material, the ratio of trans-fatty acid alkyl ester in the mono-unsaturated fatty acid alkyl ester may be bigger than 17 percent by weight. In particular, when used fat in group C as a starting raw material, the ratio is preferably 28 percent by weight and less.

As described in more detail, a fatty acid alkyl ester having the following fatty acid composition:
(1) 2.5 percent by weight and less of fatty acid having a carbon number of 14 and less,
(2) 30 percent by weight and less of fatty acid having a carbon number of 16,
(3) 70 percent by weight and more of fatty acid having a carbon number of 18, and
(4) 3 percent by weight and less of fatty acid having a carbon number of 20 and more
is preferably hydrogenated to produce the hydrogenated fatty acid alkyl ester having properties (b) as follows:
(b) properties
(1) the amount of the di- or more-unsaturated fatty acid alkyl ester is 10 percent by weight and less,
(2) the ratio of a trans-fatty acid alkyl ester in the mono-unsaturated fatty acid alkyl ester is 17 percent by weight and less.

Also, a fatty acid alkyl ester having the following fatty acid composition:
(1) 2.5 percent by weight and less of fatty acid having a carbon number of 14 and less,
(2) from 30 to 60 percent by weight of fatty acid having a carbon number of 16,
(3) from 40 to 70 percent by weight of fatty acid having a carbon number of 18, and
(4) 3 percent by weight and less of fatty acid having a carbon number of 20 and more
is preferably hydrogenated to produce the hydrogenated fatty acid alkyl ester having properties (b) as follows:
(b) properties
(1) the amount of the di- or more-unsaturated fatty acid alkyl ester is 8 percent by weight and less,
(2) the ratio of a trans-fatty acid alkyl ester in the mono-unsaturated fatty acid alkyl ester is 5 percent by weight and less.

Additionally, a fatty acid alkyl ester having the following fatty acid composition:
(1) 10 percent by weight and less of fatty acid having a carbon number of 14 and less,
(2) from 10 to 30 percent by weight of fatty acid having a carbon number of 16,
(3) from 10 to 35 percent by weight of fatty acid having a carbon number of 18,
(4) 30 percent by weight and more of fatty acid having a carbon number of 20 and more, and
(5) the amount of the tetra- or more-unsaturated fatty acid is 10 percent by weight and more
is preferably hydrogenated to produce the hydrogenated fatty acid alkyl ester having properties (b) as follows:
(b) properties
(1) the amount of the di- or more-unsaturated fatty acid alkyl ester is 15 percent by weight and less,
(2) the ratio of a trans-fatty acid alkyl ester in the mono-unsaturated fatty acid alkyl ester is 28 percent by weight and less.

The presence of a hydrogenation catalyst is necessary at the time of hydrogenation. Advantageously, the hydrogenation catalyst containing at least one of noble metals selected from those of Groups 8-10 in the periodic table is used. The noble metal includes, without limitation, palladium (Pd), platinum (Pt), rhodium (Rh), iridium (Ir), rhenium (Re), and ruthenium (Ru). The noble metal may be used alone, or multiple noble metals may be used. Of the noble metal, in particular, palladium (Pd) or platinum (Pt) alone may be used, or both may be presented. Rhodium (Rh), iridium (Ir), rhenium (Re), or ruthenium (Ru) is advantageously presented in combination with palladium (Pd) or platinum (Pt). In addition, rare earth elements are usually presented in the hydrogenation catalyst composition for purifying fuel, however, the rare earth elements are not necessarily essential in the present invention.

The noble metal is preferably supported on a porous support. The support can be used, without limitation, including known porous inorganic oxides or crystalline aluminosilicate zeolite, or porous carbon compounds. The porous inorganic oxides capable of using as a hydrogenation catalyst of petroleum diesel may be used, including alumina, silica, titania, zirconia, silica-alumina, alumina-boria, alumina-titania, alumina-phosphorus, silica-titania, titania-zirconia, ultrastable Y zeolite. Preferred support can include a support having a low surface acidity, such as a support having a small number of acidic sites. In addition, preferred support includes that having a low surface acidity and porous structure so that solution containing metals is not penetrated into the support, and is supported only on the surface of the support. Several methods for measuring the acidic sites are known. As a example of the support having small number of acidic sites, a support having an adsorption heat of less than 90 kJ/mol can be mentioned, measured by ammonia adsorption heat test method, wherein the method is determined the acid strength distribution by measuring quantity of heat when ammonia adsorbs to acidic sites. Illustrative example of the support includes silica, alumina, zeolite having silica/alumina ratio of 40 and more.

As the method for supporting the noble metal on the support, conventional methods for producing hydrogenation catalyst can be used, including a conventional impregnation method of supporting the impregnation solution on the support, a method for kneading support precursors and the impregnation solution, followed by molding, drying and calcining.

The preferred loading amount of the noble metal in the noble metal-supported hydrogenation catalyst is from 0.1 to 10 percent by weight. Additionally, when the noble metal is composed of palladium and platinum, preferred ratio of Pd/Pt atom is from 0.1/10 to 10/1.

The amount of the hydrogenation catalyst used is not defined generally because the amount varies based on raw materials of fatty acid alkyl esters to be hydrogenated or hydrogenation condition. For example, when used the catalyst in slurry-bed, the preferred weight ratio of the catalyst and material to be hydrogenated is from $10^{-4}$ to $10^{-1}$, more preferably, from $10^{-3}$ to $3 \times 10^{-2}$.

The hydrogenation condition of the fatty acid alkyl ester is not particularly limited, as long as with hydrogenation is carried out with the hydrogenation catalyst under the range of low hydrogen pressure as described. Any condition may be used, provided that biodiesel fuel having having an excellent oxidative stability, which is characteristic of the present invention, can be produced. Preferred hydrogenation temperature is from room temperature to about 180° C. in order to avoid thermal polymerization of the unsaturated fatty acids, more preferably, from 40 to 150° C., inclusive. Preferred hydrogenation time is from 30 minutes to 2 hours.

The hydrogenation reaction can be carried out by using a hydrogenation system comprising a batch-wise low pressure catalytic reactor in which a certain amount of the fatty acid alkyl ester is charged, and hydrogenated in the presence of a certain amount of the hydrogenation catalyst under low pressure, or by using a hydrogenation system comprising a flow low pressure catalytic reactor capable of hydrogenating under low pressure in flow condition supplying the fatty acid alkyl ester and hydrogen to a catalytic layer continuously. In the later system, hydrogen gas exhausted from the flow low pressure catalytic reactor is purified in a purifying apparatus of hydrogen gas, and returned to a supplying apparatus of hydrogen gas.

In addition, the fatty acid alkyl ester may be dewatered or dried in a dewatering or drying apparatus before hydrogenation. As used herein, the low pressure catalytic reactor means a catalytic reactor capable of hydrogenating under low pressure as defined in the present invention.

In the present invention, the fatty acid alkyl ester and petroleum diesel can be added and mixed, and then the mixture can be hydrogenated. The amount of the fatty acid alkyl ester added to petroleum diesel is not particularly limited, for example, up to 50 percent by weight of the fatty acid alkyl ester can be added to petroleum diesel, more practically, up to 20 percent by weight of the fatty acid alkyl ester can be added to petroleum diesel. The hydrogenation condition of the mixture comprising the fatty acid alkyl ester and petroleum diesel is similar to that as described above.

In the present invention, the fatty acid alkyl ester can be hydrogenated to obtain biodiesel fuel, and the biodiesel fuel can be added and mixed with petroleum diesel to use it as a fuel. The amount of biodiesel fuel added to petroleum diesel is not particularly limited, for example, up to 50 percent by weight of the biodiesel fuel can be added to petroleum diesel, more practically, up to 20 percent by weight of the biodiesel fuel can be added to petroleum diesel.

Biodiesel fuel obtained by the present invention has an excellent oxidative stability. For example, mixed oil comprising 5% of a hydrogenated fatty acid alkyl ester added to petroleum diesel meets the standard of increment of acid value, which is an added item to the revised Act on the Quality Control. That is, the amount of value increased of biodiesel fuel after forced oxidation is 0.12 mg-KOH/g and less. The acid value of biodiesel fuel can be measured according to JIS K2501. Biodiesel fuel of the present invention meets the standards as defined in JIS K2390, EN14214, and ASTM D6751, and can well satisfy the standards as defined in EAS-ERIA BDF Standard (EEBS) and Standard as defined in Worldwide Fuel Charter (WWFC).

Petroleum diesel-containing biodiesel fuel using biodiesel fuel obtained from the present invention has an excellent oxidative stability and can also avoid the decrease of fluidity at low temperature. Therefore, the petroleum diesel-containing biodiesel fuel meets the standard of fuel in terms of fluidity at low temperature, and also meets the standards of pour point, cloud point, and cold filter plugging point. For example, the petroleum diesel-containing biodiesel fuel well meets the specification of Grade 2 petroleum diesel (for the season of spring to autumn) as described in JIS K2204, i.e. −7.5° C. and less, and the fuel can be used as a fuel for the season of spring to autumn in European Union (EU), a fuel for all season in Australia, or a fuel for all season in Asia, in particular, all area of West Asia. The fuel can be used in other areas than above area. Additionally, the properties of the fuel at low temperature is further improved by combining a low temperature fluidity improver to the fuel, so that the biodiesel fuel of the present invention can also be used in the above area and other areas in cold season. For example, the fuel can be used as a Special Grade 3 petroleum diesel (pour point <−30° C.) for frigid Hokkaido.

The low temperature fluidity improver is already known, for example, ethylene-vinyl acetate copolymer (EVA) based additives can be used. Known method for adding the used amount of the low temperature fluidity improver may be used.

The pour point refers to a minimum temperature that a sample flows when the sample is heated to 45° C. and cooled without stirring the sample according to the defined method (JIS K2269). The cloud point refers to a temperature that a sample starts to be misty or cloud at the bottom of the test tube because of precipitation of paraffin wax when the sample cooled without stirring according to the defined method. The cold filter plugging point refers to a temperature that filtration time of 20 ml of a sample is over 60 seconds when the sample is filtered with suction via a wire mesh having an opening of 45 μm while cooling the sample according to the defined method, or to a temperature that a sample can't pass the filter.

Advantage of the Invention

According to the present invention, biodiesel fuel having an excellent oxidative stability can be produced by hydrogenation under ordinary pressure without the need of the pressure resistant/high pressure facilities. According to the present invention, mixed substrate with petroleum can be provided that meets the regulations for quality control of oxidative stability of biodiesel fuel-containing petroleum diesel in Japan without using conventional methods adding any antioxidant. Also, a non-purified crude fatty acid alkyl ester, in particular a crude fatty acid alkyl esters containing a various of natural antioxidants can be hydrogenated at a temperature as low as about 40° C. to obtain biodiesel fuel having an excellent oxidative stability. The biodiesel fuel can be mixed with petroleum diesel including a high concentration of sulphur in an amount of up to 20 percent by weight. Further, biodiesel fuel of the present invention and biodiesel fuel-containing petroleum diesel has an excellent oxidative stability, as well as satisfied properties at low temperature, and effective in inhibiting sludge (precipitate), so the invention is really practical.

DETAILED DESCRIPTION OF THE INVENTION

Hereinafter, the present invention will be described in more detail with reference to following Examples. It is noted that the present invention is not limited to these Examples.

As a fatty acid alkyl ester oil, methyl ester oil of purified palm oil, methyl ester oil of rapeseed oil, methyl ester oil of Jatropha oil, methyl ester oil of fish oil, and methyl ester oil of waste edible oil was used. Jatropha oil methyl ester was obtained from Thailand. Other methyl esters were obtained domestically. The fatty acid composition of each methyl ester oils are shown in Table 1. The FAME as shown herein is a fatty acid methyl ester (Fatty Acid Methyl Ester). cis-monovalent means a cis-isomer having one carbon-carbon unsaturated double bond, trans-monovalent means a trans-isomer having one carbon-carbon unsaturated double bond.

TABLE 1

| | purified palm oil | rapeseed oil | Jatropha oil | fish oil | waste edible oil |
|---|---|---|---|---|---|
| C14FAME | 1.3 | 0.1 | 0.1 | 4.5 | 1.1 |
| C16FAME | 4.5 | 5.2 | 15.1 | 25 | 11.4 |
| C18FAME | 53.3 | 92.3 | 84.4 | 34.5 | 85.9 |
| C20FAME | 0.5 | 2.4 | 0.3 | 34.6 | 1.5 |
| saturated FAME | 5.1 | 8 | 21.5 | 29.1 | 16.4 |
| cis-monovalent unsaturated FAME | 38.9 | 64.5 | 41.1 | 35.6 | 51.1 |
| trans-monovalent unsaturated FAME | 0 | 0.1 | 0 | 1.2 | 0.5 |
| di-unsaturated FAME | 9.9 | 19.8 | 37.2 | 3.6 | 26.7 |
| tri-unsaturated FAME | 0.2 | 7.6 | 0.2 | 2.5 | 5.3 |
| tetra-unsaturated FAME | 0 | 0 | 0 | 1.5 | 0 |
| penta-unsaturated FAME | 0 | 0 | 0 | 10.3 | 0 |
| hexa-unsaturated FAME | 0 | 0 | 0 | 16.3 | 0 |
| 100% biodiesel | | | | | |
| induction time (h) | 3.3 | 3.8 | 1.8 | 0.1 | 2.8 |
| pour point (° C.) | 15 | −12 | 3 | 2 | −3 |
| 5 weight % biodiesel mixed light oil increment of acid value (mgKOH/g) | 1.3 | 3.5 | 5.2 | *2.9 | 8.4 |

*Precipitates formed, so its supernatant was measured.

EXAMPLE 1

(Preparation of Hydrogenation Catalyst)

To 20 g of ultrastable Y zeolite having a high ratio of silica/alumina (silica/alumina ratio =390, the amount of acidic site with adsorption heat ≥90 kJ/mol: 0 mol/g), aqueous Pd tetraammine complex solution and aqueous Pt tetraammine complex solution (Pd/Pt molar ratio=4/1) was supported by impregnation process so that the load of the complex is 0.24 g in metal equivalent, resulting in a Catalyst A. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester as described in Table 1, and 1.0 g of Catalyst A(1) which Catalyst A was molded so as to have an particle size of 1.0-1.4 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 2.

Reference Example 1 Measurement of the Fatty Acid Composition of the Hydrogenation Biodiesel Fuel The fatty acid composition of biodiesel fuel was determined after hydrogenation. The mesurement was done by gas chromatography (produced from Agilent, 6890N type). (Analyzing condition: detector=FID, column =88% cyanopropyl) [aryl]polysiloxane capillary column (Agilent HP-88 length× inner diameter×film thickness=100 m×250 μm×0.2 μm), heating condition=155° C., 20 minutes to heating 2° C./min to 2.5 minutes, flow rate of support has: 2.40 ml/min (constant flow mode), split ratio: 100:1).

EXAMPLE 2

(Preparation of Hydrogenation Catalyst)

To 20 g of ultrastable Y zeolite having a high ratio of silica/alumina (silica/alumina ratio=390), aqueous Pd tetraammine complex solution was supported by impregnation process so that the load of the complex is 0.24 g in metal equivalent, resulting in a Catalyst B. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester as described in Table 1, and 1.0 g of Catalyst B(1) which Catalyst B was molded so as to have an particle size of 1.0-1.4 mm were charged in a glass autoclave, and hydrogenated at hydrogen pressure of 0.5 MPa at 80° C. for 1.5 hours to obtain biodiesel fuel. The resulting oil was analyzed with gas chromatography using a condition of Reference example 1, the composition is as shown in Table 2.

EXAMPLE 3

(Preparation of Hydrogenation Catalyst)

To 20 g of ultrastable Y zeolite having a high ratio of silica/alumina (silica/alumina ratio=390), aqueous Pt tetraammine complex solution was supported by impregnation process so that the load of the complex is 0.24 g in metal equivalent, resulting in a Catalyst C. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester as described in Table 1, and 1.0 g of Catalyst C(1) which Catalyst C was molded so as to have an particle size of 1.0-1.4 mm were charged in a glass autoclave, and hydrogenated at hydrogen pressure of 0.5 MPa at 80° C. for 2 hours to obtain biodiesel fuel. The resulting oil was analyzed with gas chromatography using a condition of Reference example 1, the composition is as shown in Table 2.

EXAMPLE 4

Production of Biodiesel Fuel (Preparation of Hydrogenation Catalyst)

The catalyst A and an alumina support were kneaded to obtain hydrogenation catalyst D. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester as described in Table 1, and 1.0 g of Catalyst D(1) which Catalyst D was molded so as to have an particle size of 1.0-1.4 mm were charged in a glass autoclave, and hydrogenated at hydrogen pressure of 0.5 MPa at 80° C. for 2 hours to obtain biodiesel fuel. The resulting oil was analyzed with gas chromatography using a condition of Reference example 1, the composition is as shown in Table 2.

EXAMPLE 5

Production of Biodiesel Fuel (Production of Biodiesel Fuel)
125 g of the waste edible oil methyl ester as described in Table 1, and 1.0 g of Catalyst D(1) were charged in a glass autoclave, and hydrogenated at hydrogen pressure of 0.3 MPa at 80° C. for 2 hours to obtain biodiesel fuel. The resulting oil was analyzed with gas chromatography using a condition of Reference example 1, the composition is as shown in Table 2.

EXAMPLE 6

Production of Biodiesel Fuel (Production of Biodiesel Fuel)
125 g of the waste edible oil methyl ester as described in Table 1, and 1.0 g of Catalyst D(3) which Catalyst D was molded so as to have an particle size of 3.2 mm were charged in a glass autoclave, and hydrogenated at hydrogen pressure of 0.5 MPa at 80° C. for 2 hours to obtain biodiesel fuel. The resulting oil was analyzed with gas chromatography using a condition of Reference example 1, the composition is as shown in Table 2.

EXAMPLE 7

Production of Biodiesel Fuel (Production of Biodiesel Fuel)
2.6 g of Catalyst D(1) which Catalyst D was molded so as to have an particle size of 1.0-1 4 mm were charged in a stainless steel reacting tube, and 125 g of the waste edible oil methyl ester as described in Table 1 was passed through a catalytic layer in the recirculation fixed-bed reactor and hydrogenated at hydrogen pressure of 0.5 MPa, WHSV=231 $h^{-1}$ at 95° C. for 1.5 hr to obtain biodiesel fuel. The resulting oil was analyzed with gas chromatography using a condition of Reference example 1, the composition is as shown in Table 2.

COMPARATIVE EXAMPLE 1

(Preparation of Hydrogenation Catalyst)
Following to the Example 1 of JP-3463089, to 20 g of ultrastable Y zeolite supported Yb as a rare earth element (Yb-ultrastable Y zeolite, Yb content; 5 percent by weight), aqueous Pd tetraammine complex solution and aqueous Pt tetraammine complex solution (Pd/Pt molar ratio=4/1) was supported by impregnation process so that the load of the complex is 0.24 g in metal equivalent, and the resulting Pd-Pt/Yb-Y zeolite catalyst was kneaded with an alumina support to obtain a hydrogenation catalyst a supported on the surface of the support. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)
125 g of the waste edible oil methyl ester as described in Table 1, and 1.0 g of Catalyst a(1) which Catalyst a was molded so as to have an particle size of 1.0-1.4 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 2.

COMPARATIVE EXAMPLE 2

(Production of Biodiesel Fuel)
125 g of the waste edible oil methyl ester as described in Table 1, and 1.0 g of Catalyst a(3) which Catalyst a was molded so as to have an particle size of 3.2 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 2.

COMPARATIVE EXAMPLE 3

(Preparation of Hydrogenation Catalyst)
To ultrastable Y zeolite having a low ratio of silica/alumina (silica/alumina ratio=13, the amount of acidic sites with adsorption heat >90 kJ/mol: 0.97 mol/g), Pd and Pt was supported by impregnation process to obtain catalyst b. This zeolite has a stronger acidic site (adsorption heat >90 kJ/mol) than the ultrastable Y zeolite having the silica/alumina ratio as used in Example 1, measured by ammonia adsorption heat test. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)
125 g of the waste edible oil methyl ester as described in Table 1, and 1.0 g of Catalyst b(1) which Catalyst b was molded so as to have an particle size of 1.0-1.4 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 2.

TABLE 2

|  | saturated FAME | unsaturated FAME | | |
| --- | --- | --- | --- | --- |
|  |  | cis-monovalent | trans-monovalent | di- or more-valent |
| Example 1 | 19.3 | 54.0 | 15.1 | 7.9 |
| Example 2 | 19.0 | 58.5 | 14.1 | 8.4 |
| Example 3 | 25.8 | 52.3 | 15.9 | 6.0 |
| Example 4 | 18.0 | 56.4 | 16.8 | 8.6 |
| Example 5 | 17.7 | 56.9 | 16.2 | 9.2 |
| Example 6 | 17.0 | 56.1 | 16.8 | 9.9 |
| Example 7 | 18.4 | 56.5 | 16.6 | 8.5 |
| Comparative EX 1 | 16.5 | 58.8 | 12.6 | 12.1 |
| Comparative EX 2 | 16.4 | 62.6 | 11.3 | 13.7 |
| Comparative EX 3 | 24.0 | 49.7 | 24.7 | 1.6 |

EXAMPLE 8

(Preparation of Hydrogenation Catalyst)
To 20 g of an alumina support, aqueous Pd tetraammine complex solution was supported by impregnation process so that the load of the complex is 0.1 g in metal equivalent, resulting in a Pd/alumina hydrogenation catalyst E, in which Pd is supported only on the surface of the support. The number of the strong acid point (adsorption heat ≥90 kJ/mol) of the alumina support as measured by ammonia adsorption heat test is smaller than that of the zeolite having a high silica/alumina ratio. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester as described in Table 1, and 1.0 g of Catalyst E(1) which Catalyst E was molded so as to have an particle size of 1.0-1.4 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 3.

COMPARATIVE EXAMPLE 4

(Preparation of Hydrogenation Catalyst)

To an alumina support, Pd was supported uniformly by impregnation process to obtain catalyst b so that the load of the complex is 0.5 wt % of Pd, resulting in a Pd/alumina hydrogenation catalyst d. The hydrogenation catalyst was reduced in hydrogen stream at 300° C. for 3 hours just before hydrogenation. The hydrogenation catalyst after reduction treatment was soaked in biodiesel fuel using the hydrogenation reaction, and used for hydrogenation experiment.

(Production of Biodiesel Fuel)

125 g of the waste edible oil methyl ester (A) as described in Table 1, and 1.0 g of Catalyst d(1) which Catalyst d was molded so as to have an particle size of 1.0-1.4 mm were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 3.

TABLE 3

|  | saturated FAME | unsaturated FAME | | |
| --- | --- | --- | --- | --- |
|  |  | cis-monovalent | trans-monovalent | di- or more-valent |
| Example 8 | 18.4 | 60.5 | 13.4 | 9.2 |
| Comparative EX 4 | 16.6 | 61.0 | 10.6 | 11.8 |

EXAMPLE 9

(Production of Biodiesel Fuel)

125 g of Jatropha oil methyl ester as described in Table 1, and 4.8 g of Catalyst E(1) were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 4.

EXAMPLE 10

(Production of Biodiesel Fuel)

125 g of Jatropha oil methyl ester as described in Table 1, and 2.4 g of Catalyst E(1) were charged in a glass autoclave, and hydrogenated at hydrogen pressure of 0.5 MPa at 80° C. for 0.8 hr to obtain biodiesel fuel. The resulting oil was analyzed with gas chromatography using a condition of Reference example 1, the composition is as shown in Table 4.

EXAMPLE 11

(Production of Biodiesel Fuel)

125 g of Jatropha oil methyl ester as described in Table 1, and 1.2 g of Catalyst E(1) were charged in a glass autoclave, and hydrogenated at hydrogen pressure of 0.5 MPa at 80° C. for 0.8 hr to obtain biodiesel fuel. The resulting oil was analyzed with gas chromatography using a condition of Reference example 1, the composition is as shown in Table 4.

COMPARATIVE EXAMPLE 5

(Production of Biodiesel Fuel)

125 g of Jatropha oil methyl ester as described in Table 1, and 4.8 g of Catalyst d(1) were charged in a glass autoclave, and hydrogenated at hydrogen pressure of 0.5 MPa at 80° C. for 1 hour to obtain biodiesel fuel. The resulting oil was analyzed with gas chromatography using a condition of Reference example 1, the composition is as shown in Table 4.

TABLE 4

|  | saturated FAME | unsaturated FAME | | |
| --- | --- | --- | --- | --- |
|  |  | cis-monovalent | trans-monovalent | di- or more-valent |
| Example 9 | 24.8 | 55.5 | 13.7 | 6.0 |
| Example 10 | 22.8 | 56.3 | 12.5 | 8.4 |
| Example 11 | 22.1 | 56.9 | 12.0 | 9.0 |
| Comparative EX 5 | 21.6 | 56.1 | 10.8 | 11.5 |

EXAMPLE 12

(Production of Biodiesel Fuel)

150 g of rapeseed oil methyl ester as described in Table 1, and 1 g of Catalyst D(1) were charged in a glass autoclave, and hydrogenated at hydrogen pressure of 0.5 MPa at 80° C. for 1.5 hours to obtain biodiesel fuel. The resulting oil was analyzed with gas chromatography using a condition of Reference example 1, the composition is as shown in Table 5.

EXAMPLE 13

(Production of Biodiesel Fuel)

150 g of rapeseed oil methyl ester as described in Table 1, and 1 g of Catalyst E(1) were charged in a glass autoclave, and hydrogenated at hydrogen pressure of 0.5 MPa at 80° C. for 1.5 hours to obtain biodiesel fuel. The resulting oil was analyzed with gas chromatography using a condition of Reference example 1, the composition is as shown in Table 5.

TABLE 5

|  | saturated FAME | unsaturated FAME | | |
| --- | --- | --- | --- | --- |
|  |  | cis-monovalent | trans-monovalent | di- or more-valent |
| Example 12 | 15.9 | 57.6 | 16.9 | 9.6 |
| Example 13 | 15.5 | 58.8 | 15.9 | 9.8 |

EXAMPLE 14

(Production of Biodiesel Fuel)

125 g of purified palm oil methyl ester as described in Table 1, and 0.96 g of Catalyst D(1) were charged in a glass autoclave, and hydrogenated at hydrogen pressure of 0.5 MPa at 100° C. for 1 hour to obtain biodiesel fuel. The resulting oil was analyzed with gas chromatography using a condition of Reference example 1, the composition is as shown in Table 6.

EXAMPLE 15

(Production of Biodiesel Fuel)

125 g of purified palm oil methyl ester as described in Table 1, and 0.96 g of Catalyst E (1) were charged in a glass autoclave, and hydrogenated at hydrogen pressure of 0.5 MPa at 100° C. for 1 hour to obtain biodiesel fuel. The resulting oil was analyzed with gas chromatography using a condition of Reference example 1, the composition is as shown in Table 6.

TABLE 6

|  | saturated FAME | unsaturated FAME | | |
|---|---|---|---|---|
|  |  | cis-monovalent | trans-monovalent | di- or more-valent |
| Example 14 | 53.1 | 36.7 | 3.6 | 6.6 |
| Example 15 | 53.2 | 35.2 | 4.8 | 6.8 |

EXAMPLE 16

(Production of Biodiesel Fuel)

150 g of the fish oil methyl ester as described in Table 1, and 4.8 g of Catalyst D(1) were charged in a glass autoclave, and hydrogenated at hydrogen pressure of 0.5 MPa at 120° C. for 2 hours to obtain biodiesel fuel. The resulting oil was analyzed with gas chromatography using a condition of Reference example 1, the composition is as shown in Table 7.

EXAMPLE 17

(Production of Biodiesel Fuel)

150 g of the fish oil methyl ester as described in Table 1, and 4.8 g of Catalyst E (1) were charged in a glass autoclave, and hydrogenated at hydrogen pressure of 0.5 MPa at 120° C. for 2 hours to obtain biodiesel fuel. The resulting oil was analyzed with gas chromatography using a condition of Reference example 1, the composition is as shown in Table 7.

TABLE 7

|  | saturated FAME | unsaturated FAME | | |
|---|---|---|---|---|
|  |  | cis-monovalent | trans-monovalent | di- or more-valent |
| Example 16 | 33.0 | 24.8 | 27.4 | 14.8 |
| Example 17 | 31.7 | 26.4 | 25.4 | 16.5 |

The oxidative stability of each biodiesel fuels was measured according to Reference example 2, and that of a various of mixed petroleum diesel containing commercially available petroleum diesel mixed with 5 percent by weight of biodiesel fuel was measured according to Reference example 3. The measurement is shown in Table 7. In addition, pour point was measured as an indication of fluidity at low temperature according to Reference example 4. The measurement is shown in Table 7. In this Table, the measurement of oxidative stability by Rancimat method represents by an hour (the same hereinafter), that of increment of acid value represents by mgKOH/g, in which the increment of acid value is a indication of oxidative stability for forced oxidation, and that of pour point represents by ° C.

Reference Example 2 Measurement of Oxidative Stability (Rancimat Method)

Rancimat method is a test method that evaluates oxidative stability of a fatty acid alkyl ester 100% as defined in EN14112, the oxidative stability of biodiesel fuels consisting of a fatty acid alkyl ester 100% after hydrogenation as described in Example 1-17 and Comparative example 1-6 was evaluated.

That is, 3 g of each sample was charged to a reactor, and clean air was purged into the reactor at a flow of 10 l/h while heating to 110° C., the resulting volatile decomposed product was collected in water, the time that elapses before the inflection point where the conductivity of the collecting water changes rapidly (i.e. induction time) was measured. The measurement was carried out with automatic fat stability test instrument (from Metrohm Ltd., Rancimat 743 type).

Reference Example 3 Measurement of Oxidative Stability (Measurement of Increment of Acid Value of Mixed Petroleum Diesel Due to Forced Oxidation)

The measurement of increment of acid value due to forced oxidation is a method that evaluate oxidative stability of mixed petroleum diesel containing petroleum diesel and 5 percent by weight of the biodiesel oil, wherein the petroleum diesel is defined in the announcement No. 81 of Japan Ministry of Economy, Trade and Industry in 2007 associated with revised Act on the Quality Control of Gasoline and Other Fuels. The oxidative stability of biodiesel fuel/petroleum diesel mixture containing 5 percent by weight of the biodiesel oil after hydrogenation as described in Example 1-17 and Comparative example 1-6 was evaluated by this method.

That is, when 20 g of a sample was charged to a reactor, and pure oxygen was purged into the reactor at a flow of 100 ml/min while heating to 115° C. to oxidize the sample for 16 hours. In this case, the acid value of the sample before and after oxidation was measured, and the difference between both acid values was calculated to obtain the increment of acid value. The measurement for acid value was carried out with automatic titration instrument (from Metrohm Ltd., Titrando type).

Reference Example 4 Measurement of Pour Point

The pour point of biodiesel fuels consisting of fatty acid alkyl esters after hydrogenation 100% as described in Example 1-17 and Comparative example 1-6, and 5 percent by weight of biodiesel fuel/petroleum diesel mixtures was measured. The pour point was measured with an automatic test instrument for pour point and cloud point complying with American Standard ASTM D6749 (from Tanaka Scientific Limited, MPC-102A type).

TABLE 8

|  | oxidative stability | | pour point (° C.) | |
|---|---|---|---|---|
|  | induction time (hour) | increment of acid value (mgKOH/g) | bio-diesel | mixed light oil |
| Example 1 | 11.8 | 0.08 | −1 | −16 |
| Example 2 | 11.2 | 0.09 | −2 | −17 |
| Example 3 | 12.5 | 0.06 | 0 | −16 |
| Example 4 | 10.8 | 0.09 | −3 | −17 |
| Example 5 | 10.5 | 0.10 | −3 | −17 |
| Example 6 | 10.3 | 0.11 | −3 | −17 |
| Example 7 | 11.1 | 0.09 | −2 | −17 |
| Example 8 | 11.0 | 0.10 | −3 | −17 |
| Example 9 | 24< | 0.01 | 11 | −14 |
| Example 10 | 24< | 0.01 | 10 | −15 |
| Example 11 | 24< | 0.01 | 10 | −15 |
| Example 12 | 15.4 | 0.08 | 2 | −16 |
| Example 13 | 14.6 | 0.09 | 1 | −17 |
| Example 14 | 24< | 0.04 | 24 | −11 |

TABLE 8-continued

| | oxidative stability | | pour point (° C.) | |
| --- | --- | --- | --- | --- |
| | induction time (hour) | increment of acid value (mgKOH/g) | bio-diesel | mixed light oil |
| Example 15 | 24< | 0.05 | 24 | −11 |
| Example 16 | 10.5 | 0.10 | 20 | −12 |
| Example 17 | 10.1 | 0.11 | 20 | −12 |
| Comparative EX 1 | 8.7 | 0.13 | −3 | −17 |
| Comparative EX 2 | 8.2 | 0.14 | −3 | −17 |
| Comparative EX 3* | 24< | 0.04 | 6 | −15 |
| Comparative EX 4 | 9.5 | 0.16 | −3 | −16 |
| Comparative EX 5 | 9.8 | 0.15 | 8 | −15 |

*Reaction occurred to form insoluble precipitates, so its supernatant was measured.

Additionally, the invention can be described as follows.

(I) biodiesel fuel obtained from (1) fat treated by transesterification reaction and/or a fatty acid alkyl ester prepared from waste edible oil, and/or (2) a fatty acid alkyl ester treated by esterification reaction of a fatty acid, wherein the time that elapses before the inflection point where water for collecting volatile decomposed product changes rapidly (i.e. induction time) is 10 hours and more when the biodiesel fuel is heated to 110° C. with flow of clean air, wherein the increment of acid value is below 0.12 mg-KOH/g after forced oxidation of mixed petroleum diesel containing 5 percent by weight of the biodiesel fuel with flow of pure oxygen at 115° C. for 16 hours.

(II) biodiesel fuel obtained by hydrogenating (1) fat treated by transesterification reaction and/or a fatty acid alkyl ester prepared from waste edible oil, and/or (2) a fatty acid alkyl ester treated by esterification reaction of a fatty acid in the presence of a hydrogenation catalyst containing at least one of noble metals selected from those of Groups 8-10 in the periodic table supported on a support having a low surface acidity and porous structure so that solution containing metals is not penetrated into the support, and is supported only on the surface of the support under low hydrogen pressure, wherein the time that elapses before the inflection point where water for collecting volatile decomposed product changes rapidly (i.e. induction time) is 10 hours and more when the biodiesel fuel is heated to 110° C. with flow of clean air, wherein the increment of acid value is below 0.12 mgKOH/g after forced oxidation of mixed petroleum diesel containing 5 percent by weight of the biodiesel fuel with flow of pure oxygen at 115° C. for 16 hours.

(III) use of hydrogenation catalyst composition containing at least one of noble metals selected from those of Groups 8-10 in the periodic table supported on a support having a low surface acidity and porous structure so that solution containing metals is not penetrated into the support, and is supported only on the surface of the support for the purpose of production biodiesel fuel obtained by hydrogenation of the fatty acid alkyl ester of the first preferred embodiment, or a petroleum diesel-containing biodiesel fuel.

While the present invention is described with reference to these embodiments as described above, the invention is not limited to these embodiments. The constituent or detail of the invention can make a various of modification so that the skilled in the art can understand within a range of the invention.

This application claims a priority based on Japanese patent application No 2010-058335, filed on 24 Feb. 2010, the entire contents of which are incorporated by reference herein.

INDUSTRIAL APPLICABILITY

The present invention can apply to biodiesel fuel, so that it can apply to biofuel industry.

The invention claimed is:

1. A method for producing biodiesel fuel, comprising:
impregnating a zeolite support with a solution containing a palladium(Pd) compound and a platinum(Pt) compound, and drying to provide a hydrogenation catalyst (I), and kneading the hydrogenation catalyst(I) with an alumina support to provide a hydrogenation catalyst composition comprising Pd and Pt, wherein the hydrogenation catalyst(I) has a Pd/Pt molar ratio of from 0.1/10 to 10/1, and a total amount of Pd and Pt in the hydrogenation catalyst(I) is from 0.1 to 10 weight %, and the Pd and Pt are supported with the zeolite support having a silica/alumina ratio of 40 or more, and
hydrogenating (1) a fatty acid methyl ester prepared from fat and/or waste edible oil by a transesterification reaction, and/or (2) a fatty acid methyl ester prepared from a fatty acid by an esterification reaction in the presence of the hydrogenation catalyst composition under about 1 MPa or less of hydrogen pressure at a temperature from 80 ° C. to 120 ° C. to prepare a hydrogenated product containing a saturated fatty acid methyl ester, a di- or more-unsaturated fatty acid methyl ester, and a mono-unsaturated fatty acid methyl ester.

2. A method for producing biodiesel fuel, comprising:
impregnating an alumina support with a solution containing a palladium(Pd) compound, and drying to provide a hydrogenation catalyst comprising Pd, wherein the alumina support is not penetrated with the solution, the Pd being supported only on the surface of the alumina support, and an amount of Pd in the hydrogenation catalyst is from 0.1 to 10 weight %, and
hydrogenating (1) a fatty acid methyl ester prepared from fat and/or waste edible oil by a transesterification reaction, and/or (2) a fatty acid methyl ester prepared from a fatty acid by an esterification reaction in the presence of the hydrogenation catalyst comprising palladium under about 1 MPa or less of hydrogen pressure at a temperature from 80 ° C. to 120 ° C. to prepare a hydrogenated product containing a saturated fatty acid methyl ester, a di- or more-unsaturated fatty acid methyl ester, and a mono-unsaturated fatty acid methyl ester.

3. A method for producing biodiesel fuel, comprising hydrogenating the fatty acid methyl ester prepared from the waste edible oil by the method of claim 1, wherein the hydrogenated product obtained from the hydrogenation has from 17 to 18.5 percent by weight of the saturated fatty acid methyl ester, 10 percent by weight and less of the di- or more-unsaturated fatty acid methyl ester, and 17 percent by weight and less of a trans-isomer of the mono-unsaturated fatty acid methyl ester.

4. A method for producing biodiesel fuel, comprising hydrogenating the fatty acid methyl ester prepared from the waste edible oil by the method of claim 2, wherein the hydrogenated product obtained from the hydrogenation has from 17 to 18.5 percent by weight of the saturated fatty acid methyl ester, 10 percent by weight and less of the di- or more-unsaturated fatty acid methyl ester, and 13 percent by weight and less of a trans-isomer of the mono-unsaturated fatty acid methyl ester.

5. A method for producing biodiesel fuel, comprising hydrogenating the fatty acid methyl ester prepared from Jatropha oil by the method of claim 1, wherein the hydrogenated product obtained from the hydrogenation has from 22.1 to 24.8 percent weight of the saturated fatty acid methyl ester, 10 percent by weight and less of the di- or more-unsaturated fatty acid methyl ester, and 12 percent by weight and less of a trans-isomer of the mono-unsaturated fatty acid methyl ester.

6. A method for producing biodiesel fuel, comprising hydrogenating the fatty acid methyl ester prepared from Jatropha oil by the method of claim 2, wherein the hydrogenated product obtained from the hydrogenation has from 22.1 to 24.8 percent by weight of the saturated fatty acid methyl ester, 12 percent by weight and less of the di- or more-unsaturated fatty acid methyl ester, and 11 percent by weight and less of a trans-isomer of the mono-unsaturated fatty acid methyl ester.

7. A method for producing biodiesel fuel, comprising hydrogenating the fatty acid methyl ester prepared from rapeseed oil by the method of claim 1, wherein the hydrogenated product obtained from the hydrogenation has from 15.5 to 15.9 percent by weight of the saturated fatty acid methyl ester, 10 percent by weight and less of the di- or more-unsaturated fatty acid methyl ester, and 17 percent by weight and less of a trans-isomer of the mono-unsaturated fatty acid methyl ester.

8. A method for producing biodiesel fuel, comprising hydrogenating the fatty acid methyl ester prepared from rapeseed oil by the method of claim 2, wherein the hydrogenated product obtained from the hydrogenation has from 15.5 to 15.9 percent by weight of the saturated fatty acid methyl ester, 10 percent by weight and less of the di- or more-unsaturated fatty acid methyl ester, and 17 percent by weight and less of a trans-isomer of the mono-unsaturated fatty acid methyl ester.

9. A method for producing biodiesel fuel, comprising hydrogenating the fatty acid methyl ester prepared from palm oil by the method of claim 1, wherein the hydrogenated product obtained from the hydrogenation has from 53.1 to 53.2 percent by weight of the saturated fatty acid methyl ester, 7 percent by weight and less of the di- or more-unsaturated fatty acid methyl ester, and 5 percent by weight and less of a trans-isomer of the mono-unsaturated fatty acid methyl ester.

10. A method for producing biodiesel fuel, comprising hydrogenating the fatty acid methyl ester prepared from palm oil by the method of claim 2, wherein the hydrogenated product obtained from the hydrogenation has from 53.1 to 53.2 percent by weight of the saturated fatty acid methyl ester, 7 percent by weight and less of the di- or more-unsaturated fatty acid methyl ester, and 5 percent by weight and less of a trans-isomer of the mono-unsaturated fatty acid methyl ester.

11. A method for producing biodiesel fuel, comprising hydrogenating the fatty acid methyl ester prepared from fish oil by the method of claim 1, wherein the hydrogenated product obtained from the hydrogenation has from 31.7 to 33 percent by weight of the saturated fatty acid methyl ester, from 14.8 to 16.5 percent by weight of the di- or more-unsaturated fatty acid methyl ester, and 28 percent by weight and less of a trans-isomer of the mono-unsaturated fatty acid methyl ester.

12. A method for producing biodiesel fuel, comprising hydrogenating the fatty acid methyl ester prepared from fish oil by the method of claim 2, wherein the hydrogenated product obtained from the hydrogenation has from 31.7 to 33 percent by weight of the saturated fatty acid methyl ester, from 14.8 to 16.5 percent by weight of the di- or more-unsaturated fatty acid methyl ester, and 26 percent by weight and less of a trans-isomer of the mono-unsaturated fatty acid methyl ester.

13. A method for producing petroleum diesel-containing biodiesel fuel, comprising:
impregnating a zeolite support with a solution containing a palladium(Pd) compound and platinum(Pt) compound, and drying to provide a hydrogenation catalyst(I), and kneading the hydrogenation catalyst(I) with an alumina support to provide a hydrogenation catalyst composition, and drying to provide the hydrogenation catalyst composition comprising Pd and Pt, wherein the hydrogenation catalyst(I) has a Pd/Pt molar ratio of from 0.1/10 to 10/1, a total amount of Pd and Pt in the hydrogenation catalyst(I) is from 0.1 to 10 weight %, and the Pd and Pt are supported with the zeolite support having a silica/alumina ratio of 40 or more,
hydrogenating (1) a fatty acid methyl ester prepared from fat and/or waste edible oil by a transesterification reaction, and/or (2) a fatty acid methyl ester prepared from a fatty acid by an esterification reaction in the presence of the hydrogenation catalyst composition under about 1 MPa or less of hydrogen pressure at a temperature from 80 ° C. to 120 ° C. to prepare a hydrogenated product containing a saturated fatty acid methyl ester, a di- or more-unsaturated fatty acid methyl ester, and a mono-unsaturated fatty acid methyl ester, and
mixing the hydrogenated product with petroleum diesel.

14. A method for producing petroleum diesel-containing biodiesel fuel, comprising:
impregnating an alumina support with a solution containing a palladium(Pd) compound, and drying to provide a hydrogenation catalyst comprising Pd, wherein the alumina support is not penetrated with the solution, the Pd being supported only on a surface of the alumina support, and an amount of Pd in the hydrogenation catalyst is from 0.1 to 10 weight %,
hydrogenating (1) a fatty acid methyl ester prepared from fat and/or waste edible oil by a transesterification reaction, and/or (2) a fatty acid methyl ester prepared from fatty acid by an esterification reaction in the presence of the hydrogenation catalyst under about 1 MPa or less of the hydrogen pressure at a temperature from 80 ° C. to 120 ° C. to prepare a hydrogenated product containing a saturated methyl ester, a di- or more-unsaturated fatty acid methyl ester, and a mono-unsaturated fatty acid methyl ester, and
mixing the hydrogenated product with petroleum diesel.

15. A method for producing the biodiesel fuel according to claim 1, wherein the zeolite support has an adsorption heat of less than 90 kJ/mol as measured by an ammonia adsorption heat test method.

16. A method for producing the biodiesel fuel according to claim 2, wherein the alumina support has an adsorption heat of less than 90 kJ/mol as measured by an ammonia adsorption heat test method.

17. A method for producing the petroleum diesel-containing biodiesel fuel according to claim 13, wherein the zeolite support has an adsorption heat of less than 90 kJ/mol as measured by an ammonia adsorption heat test method.

18. A method for producing the petroleum diesel-containing biodiesel fuel according to claim 14, wherein the alumina support has an adsorption heat of less than 90 kJ/mol as measured by an ammonia adsorption heat test method.

\* \* \* \* \*